United States Patent Office 3,134,771
Patented May 26, 1964

3,134,771
3-TETRAHYDROPYRANYL ETHERS OF ESTRA-1,3,5(10)-TRIENES
Pietro de Ruggieri and Carmelo Gandolfi, Milan, Italy, assignors to Ormonoterapia Richter S.p.A., Milan, Italy, a corporation of Italy
No Drawing. Filed Aug. 30, 1962, Ser. No. 220,551
Claims priority, application Italy May 12, 1962
6 Claims. (Cl. 260—239.55)

This invention relates to new compounds of general formula:

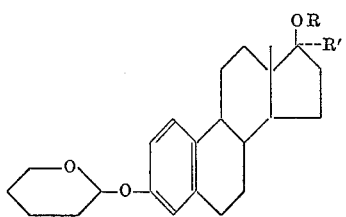

wherein R is one of the constituents of the group consisting of hydrogen and tetrahydropyranyl and R' is one of the constituents of the group consisting of hydrogen and of the methyl, ethyl, vinyl and ethinyl radicals.

These compounds are endowed with pronounced estrogenic activity and are more active than the corresponding compounds unprovided with the tetrahydropyranyl group, especially when they are administered by mouth.

To prepare these compounds, the phenolic and alcoholic groups of the steroids are esterified by means of a treatment with 2, 3-dihydropyran either pure or diluted with suitable solvents, in the presence of an acid catalyst, preferably phosphorus oxychloride or p-toluenesulfonic acid.

The mono-pyranyl phenolic ethers of steroids having an alcoholic group in position 17 are prepared by reacting the phenol-pyranyl-ethers-17-ketones with sodium borohydride or lithium aluminum hydride to obtain 17β-alcohols, or with potassium acetylide to obtain 17α-ethinyl-17β-hydroxy compounds, from which 17α-vinyl and 17α-ethyl-17β-hydroxy-steroids are obtained, the former by means of a partial reduction in the presence of pyridine, and the latter by means of a total reduction.

The following examples are meant to be explanatory only and are in no way to be construed as limiting the invention.

EXAMPLE 1

*Estra-1,3,5(10)-Trien-Bis[3-(2'),17β-(2'')-Tetrahydropyranyloxy]*

0.1 part of phosphorus oxychloride are added to a solution of 5 parts of estra-1,3,5(10)-trien-3, 17β-diol in a mixture of 42 parts of tetrahydrofuran and 12 parts of 2,3-dihydropyran. The mixture is allowed to stand at room temperature for 3 hours and it is then poured into a mixture of 200 parts of a 5% NaHCO₃ solution and 200 parts of ice. The product is collected by filtration and recrystallized from dilute methanol: 5.3 parts of estra-1,3,5(10) - trien-bis-[3-(2'),17β-(2'')-tetrahydropyranyloxy] are obtained. The product has M.P. 76–81° C. and $[\alpha]_D = +21.8°$ (ethanol).

EXAMPLE 2

*17α-Methyl-Estra-1,3,5(10)-Trien-Bis-[3-(2'),17β-(2'')-Tetrahydropyranyloxy]*

5 parts of 2,3-dihydropyran and 0.04 part of phosphorus oxychloride are added to a solution of 2 parts of 17α-methyl-estra-1,3,5(10)-trien-3,17β-diol in 20 parts of dioxane. After standing for 4 hours at room temperature, the mixture is poured into 200 parts of a 5% NaHCO₃ solution admixed with 200 parts of ice. The product is collected by filtration and recrystallized from dilute methanol: 2.1 parts of 17α-methyl-estra-1,3,5(10)-trien-bis-[3-(2'),17β-(2'')-tetrahydropyranyloxy] are obtained. The product has M.P. 96–98° C. and $[\alpha]_D = +16°$ (pyridine).

EXAMPLE 3

*17α-Ethinyl-Estra-1,3,5(10)-Trien-Bis-[3-(2'),17β-(2'')-Tetrahydropyranyloxy]*

Operating at a temperature of 0° C., 2 parts of 17α-ethinyl-estra-1,3,5(10)-trien-3,17β-diol are dissolved in 15 parts of 2,3-dihydropyran, and 0.05 part of phosphorus oxychloride are added to the solution. After standing for 48 hours at room temperature, 200 parts of ethyl ether are added and the organic phase is washed with a 5% NaHCO₃ solution and with water. It is then evaporated to dryness under vacuum and the product is recrystallized from petroleum ether: the yield is 1.92 parts of 17α-ethinyl - estra-1,3,5(10)-trien-bis-[3-2'),17β-(2'')-tetrahydropyranyloxy], having M.P. 153–155° C. and $[\alpha]_D = -24°$ in pyridine.

EXAMPLE 4

*3-(2'-Tetrahydropyranyloxy)-17α-Ethinyl-Estra-1,3,5(10-)-Trien-17β-Ol.*

Four parts of 3-(2'-tetrahydropyranyloxy)-17α-ethinyl-estra-1,3,5(10)-trien-17-one are dissolved in a mixture of 34 parts of anhydrous toluene and 260 parts of anhydrous ethyl ether. The solution is cooled to 0° C. and is kept at this temperature while it is (1) de-aerated by bubbling a stream of nitrogen through it for 30 minutes, and then (2) saturated with acetylene. Fifty-six parts of a 14.5% solution of potassium tert. amylate in tert. amyl alcohol are then added over a period of 15 minutes and acetylene is bubbled through the mixture for 5 hours. The mixture is stored overnight at a temperature of —5° C., it is subsequently extracted three times with 60 parts of a 12.5% NH₄Cl solution and then washed with water until neutral. The organic phase is thoroughly dehydrated over Na₂SO₄, evaporated to dryness and chromatographed on 80 parts of Al₂O₃. From 1:1 benzenepetroleum ether eluates, through subsequent recrystallization from dilute methanol, 3.5 parts of 3-(2'-tetrahydropyranyloxy)-17α-ethinyl-estra-1,3,5(10)-trien-17β-ol are obtained. The product has M.P. 68–71° C. and $[\alpha]_D = 5.5$ in ethanol.

EXAMPLE 5

*3-(2'-Tetrahydropyranyloxy)-17α-Ethinyl-Estra-1,3,5(10)-Trien-17β-Ol*

A solution of 3-(2'-tetrahydropyranyloxy)-estra-1,3,5(10)-trien-17-one in a mixture of 17 parts of toluene and 135 parts of anhydrous ethyl ether is de-aerated by passing a nitrogen stream through it for 30 minutes, at a temperature of 0° C. The solution is subsequently saturated with acetylene. Thirty parts of a 13% solution of potassium tert. butylate in tert. butanol are added over a period of 15 minutes, and acetylene is kept bubbling for 8 hours through the mixture, which is then stored for 5 days in ice at a temperature of —5° C. The precipitate that has formed is then collected by filtration, washed with 10 parts of anhydrous ethyl ether, dried under vacuum, ground in a mortar with 30 parts of a 12% NH₄Cl solution, again collected by filtration, washed with water until neutral, and finally recrystallized from dilute methanol. Yield: 1.8 parts of 3-(2'-tetrahydropyranyloxy)-17α-ethinyl-estra-1,3,5(10)-trien-17β-ol, having M.P. 69–71° C. and $[\alpha]_D = +5.6$ in ethanol.

EXAMPLE 6

*3-(2'-Tetrahydropyranloxy)-17α-Vinyl-Estra-1,3,5(10)-Trien-17β-Ol*

1.25 parts of 3-(2'-tetrahydropyranyloxy)-17α-ethinyl-estra-1,3,5(10)-trien-17β-ol are dissolved in a mixture of 85 parts of pyridine and 75 parts of dioxane; 1.2 parts of palladium-on-calcium carbonate are added, and hydrogenation is carried out under a pressure of 760 mm./Hg. When 84 parts of hydrogen have been absorbed the catalyst is filtered off, the filtered solution is evaporated down to a small volume under reduced pressure and fully diluted with water. The collected product is recrystallized from dilute methanol and 1.15 parts of 3-(2'-tetrahydropyranyloxy)-17α-vinyl-estra-1,3,5(10)-trien-17β-ol are thus recovered: it has M.P. 57–59° C. and $[\alpha]_D = +50°$ in ethanol.

EXAMPLE 7

*3-(2'-Tetrahydropyranyloxy)-17α-Ethyl-Estra-1,3,5(10)-Trien-17β-Ol*

2 parts of 3-(2'-tetrahydropyranyloxy)-17α-ethinyl-estra-1,3,5(10)-trien-17β-ol are dissolved in 100 parts of ethanol and hydrogenated in the presence of 2 parts of 5% palladium-on-calcium carbonate. The catalyst is thereafter filtered off and the solution is concentrated and then diluted with water. 1.95 parts of 3-(2'-tetrahydropyranyloxy)-17α-ethyl-estra-1,3,5(10)-trien-17β-ol are thus obtained. The product has M.P. 66–68° C. and $[\alpha]_D = +42°$ in ethanol.

EXAMPLE 8

*3-(2'-Tetrahydropyranyloxy)-Estra-1,3,5(10)-Trien-17β-Ol*

Two parts of LiAlH$_4$ are added to a solution of 10 parts of 3-(2'-tetrahydropyranyloxy)-estra-1,3,5(10)-trien-17-one in 50 parts of anhydrous tetrahydrofuran and the mixture is refluxed for 1 hour.

Two parts of ethyl acetate are added to decompose the residual LiAlH$_4$, the mixture is filtered and highly diluted with water. The crude product is collected by filtration and recrystallized from ethyl ether: 9.2 parts of 3-(2'-tetrahydropyranyloxy)-estra-1,3,5,(10)-trien-17β-ol are recovered. It has M.P. 147–150° C. and $[\alpha]_D = +76°$ (pyridine).

EXAMPLE 9

*3-(2'-Tetrahydropyranyloxy)-estra-1,3,5(10)-Trien-17β-Ol*

0.6 part of NaBH$_4$ dissolved in 3 parts of water are added to a solution of 5 parts of 3-(2'-tetrahydropyranyloxy)-estra-1,3,5(10)-trien-17-one in 30 parts of methanol and the mixture is refluxed for 1 hour. Water is then added, the crude product is collected by filtration and recrystallized from ethyl ether: 4.8 parts of 3-(2'-tetrahydropyranyloxy) - estra - 1,3,5(10) - trien - 17β - ol are recovered. It has M.P. 146–148° C. and $[\alpha]_D = +77°$ (pyridine).

What we claim is:

1. A compound of the formula:

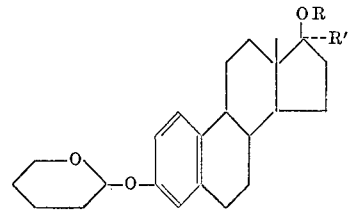

wherein R is a member selected from the group consisting of hydrogen and tetrahydropyranyl and R' is a member selected from the group consisting of hydrogen, methyl, ethyl, and vinyl.

2. Estra - 1,3,5(10) - trien - bis - [3 - (2'),17β - (2'')-tetrahydropyranyloxy].

3. 17α - methyl - estra - 1,3,5(10) - trien - bis - [3-(2'),17β-(2'')-tetrahydropyranyloxy].

4. 3 - (2' - tetrahydropyranyloxy) - 17α - vinyl - estra-1,3,5(10)-trien-17β-ol.

5. 3 - (2' - tetrahydropyranyloxy) - 17α - ethyl-estra-1,3,5(10)-trien-17β-ol.

6. 3 - (2' - tetrahydropyranyloxy) - estra - 1,3,5(10)-trien-17β-ol.

References Cited in the file of this patent

UNITED STATES PATENTS

| | | |
|---|---|---|
| 2,939,819 | Barton et al. | June 7, 1960 |
| 3,075,970 | Nomine et al. | Jan. 29, 1963 |